United States Patent
Hoess et al.

(10) Patent No.: US 7,790,079 B2
(45) Date of Patent: Sep. 7, 2010

(54) THERMOPLASTIC MOLDING MATERIAL AND MOLDING ELEMENTS CONTAINING NANOMETRIC INORGANIC PARTICLES FOR MAKING SAID MOLDING MATERIAL AND SAID MOLDING ELEMENTS, AND USES THEREOF

(75) Inventors: Werner Hoess, Shanghai (CN); Klaus Albrecht, Mainz (DE); Krzysztof Sado, Mainz (DE); Harald Haeger, Luedinghausen (DE)

(73) Assignee: Evonik Rohm GmbH, Darmstadt (DE)

( * ) Notice: Subject to any disclaimer, the term of this patent is extended or adjusted under 35 U.S.C. 154(b) by 375 days.

(21) Appl. No.: 11/817,407

(22) PCT Filed: Apr. 11, 2006

(86) PCT No.: PCT/EP2006/003316

§ 371 (c)(1),
(2), (4) Date: Aug. 30, 2007

(87) PCT Pub. No.: WO2006/111302

PCT Pub. Date: Oct. 26, 2006

(65) Prior Publication Data

US 2008/0161469 A1    Jul. 3, 2008

(30) Foreign Application Priority Data

Apr. 18, 2005   (DE)   .................... 10 2005 017 950

(51) Int. Cl.
B29C 47/00    (2006.01)
(52) U.S. Cl. .................. 264/211; 264/13; 366/76.6; 366/101
(58) Field of Classification Search ............ 264/211.23, 264/211, 13; 366/76.6, 101
See application file for complete search history.

(56) References Cited

U.S. PATENT DOCUMENTS

| | | | |
|---|---|---|---|
| 4,833,221 A | 5/1989 | Albrecht | |
| 5,110,877 A | 5/1992 | Hoess et al. | |
| 5,155,172 A | 10/1992 | Siol et al. | |
| 5,219,931 A | 6/1993 | Siol et al. | |
| 5,270,397 A | 12/1993 | Rhein et al. | |
| 5,280,073 A | 1/1994 | Siol et al. | |
| 5,548,033 A * | 8/1996 | Vetter et al. .................. | 525/378 |
| 5,652,316 A | 7/1997 | May et al. | |
| 5,705,189 A | 1/1998 | Lehmann et al. | |
| 5,935,514 A * | 8/1999 | Ford et al. .................. | 264/630 |
| 6,040,387 A | 3/2000 | Albrecht et al. | |
| 6,287,470 B1 | 9/2001 | Vetter et al. | |
| 6,355,712 B1 | 3/2002 | Schultes et al. | |
| 6,469,073 B1 | 10/2002 | Manke et al. | |
| 6,576,255 B1 | 6/2003 | Petereit et al. | |
| 6,613,871 B2 | 9/2003 | Hoess et al. | |
| 6,746,767 B2 | 6/2004 | Gottfried et al. | |
| 6,761,747 B2 | 7/2004 | Gottfried et al. | |
| 6,765,046 B1 | 7/2004 | Numrich et al. | |
| 6,803,416 B2 | 10/2004 | Schultes et al. | |
| 6,809,163 B2 | 10/2004 | Schultes et al. | |
| 6,890,993 B2 | 5/2005 | Schultes et al. | |
| 6,998,140 B2 | 2/2006 | Meier et al. | |
| 7,046,952 B2 | 5/2006 | Kurotori et al. | |
| 7,179,852 B2 | 2/2007 | Schultes et al. | |
| 7,235,298 B2 | 6/2007 | Katusic et al. | |
| 7,371,337 B2 | 5/2008 | Katusic et al. | |
| 2002/0082331 A1 | 6/2002 | Mielewski et al. | |
| 2002/0160042 A1 | 10/2002 | Petereit et al. | |
| 2004/0104501 A1 | 6/2004 | Petereit et al. | |
| 2004/0116567 A1 | 6/2004 | Schmitt et al. | |
| 2004/0249037 A1 | 12/2004 | Kolbe et al. | |
| 2005/0065224 A1 | 3/2005 | Menzler et al. | |
| 2005/0080188 A1 | 4/2005 | Schultes et al. | |
| 2005/0131126 A1 * | 6/2005 | Yang et al. .................. | 524/445 |
| 2005/0152977 A1 | 7/2005 | Petereit et al. | |
| 2005/0267250 A1 | 12/2005 | Theil et al. | |

(Continued)

FOREIGN PATENT DOCUMENTS

JP    2000 53871    2/2000

OTHER PUBLICATIONS

U.S. Appl. No. 12/094,277, filed May 20, 2008, Schultes, et al.

(Continued)

*Primary Examiner*—Christina Johnson
*Assistant Examiner*—Galen Hauth
(74) *Attorney, Agent, or Firm*—Oblon, Spivak, Maier & Neustadt, L.L.P.

(57) ABSTRACT

(EN) The invention concerns a method for producing a thermoplastic molding material or element, said material or element containing nanometric inorganic particles. In molten state, the thermoplastic is mixed with the nanometric inorganic particles and with a solubilizing agent in a conveyor screw extruder, the pressures and temperatures being adjusted so that the plastic is in melt form and the solubilizing agent in supercritical state. The invention is characterized in that at the output of the extruder, the mixture passes through a slot with a passage less than 20 $g(m)m$ to penetrate into an expansion zone and the molten material, wherein are incorporated the nanometric inorganic particles, is evacuated, reduced into molding material after cooling or transferred into a molding tool to be molded. The invention also concerns the molding material and the molding elements obtained by this method, as well as the uses thereof.

21 Claims, No Drawings

U.S. PATENT DOCUMENTS

| | | | |
|---|---|---|---|
| 2005/0279707 A1* | 12/2005 | Matthews et al. | 210/634 |
| 2006/0052515 A1 | 3/2006 | Schultes et al. | |
| 2006/0121248 A1 | 6/2006 | Lorenz et al. | |
| 2006/0147714 A1 | 7/2006 | Schultes et al. | |
| 2006/0175735 A1 | 8/2006 | Hoess et al. | |
| 2006/0216441 A1 | 9/2006 | Schubel et al. | |
| 2006/0281846 A1 | 12/2006 | Hager et al. | |
| 2007/0055017 A1 | 3/2007 | Schultes et al. | |
| 2007/0066708 A1 | 3/2007 | Goldacker et al. | |
| 2007/0094757 A1 | 4/2007 | Pridohl et al. | |
| 2007/0112135 A1 | 5/2007 | Wicker et al. | |
| 2007/0122624 A1 | 5/2007 | Schultes et al. | |
| 2007/0123610 A1 | 5/2007 | Schultes et al. | |
| 2007/0149395 A1 | 6/2007 | Kroell et al. | |
| 2007/0172406 A1 | 7/2007 | Pridoehl et al. | |
| 2007/0172415 A1 | 7/2007 | Zimmermann et al. | |
| 2007/0173581 A1 | 7/2007 | Hager et al. | |
| 2007/0183918 A1 | 8/2007 | Monsheimer et al. | |
| 2007/0197703 A1 | 8/2007 | Neuhäuser et al. | |
| 2007/0199477 A1 | 8/2007 | Hill et al. | |
| 2007/0222117 A1 | 9/2007 | Hoess et al. | |
| 2007/0276093 A1 | 11/2007 | Schultes et al. | |
| 2008/0135799 A1 | 6/2008 | Pridoehl et al. | |
| 2008/0248298 A1 | 10/2008 | Numrich et al. | |
| 2008/0305335 A1 | 12/2008 | Schultes et al. | |

OTHER PUBLICATIONS

U.S. Appl. No. 12/300,408, filed Nov. 11, 2008, Hoess, et al.
U.S. Appl. No. 11/748,874, filed May 15, 2007, Schultes, et al.
U.S. Appl. No. 11/720,653, filed Jun. 1, 2007, Schultes, et al.
U.S. Appl. No. 11/813,946, filed Jul. 13, 2007, Schultes, et al.
U.S. Appl. No. 11/913,325, filed Nov. 1, 2007, Schwarz-Barac, et al.
U.S. Appl. No. 60/831,222, filed Jul. 17, 2006, Hager, et al.
U.S. Appl. No. 12/436,809, filed May 7, 2009, Schultes, et al.
U.S. Appl. No. 12/089,926, filed Jun. 4, 2008, Haeger, et al.
U.S. Appl. No. 09/044,797, filed Mar. 20, 1998, Brudny, et al.
U.S. Appl. No. 11/574,020, filed Feb. 21, 2007, Katusic, et al.
U.S. Appl. No. 11/720,613, filed Jun. 1, 2007, Pridoehl, et al.
U.S. Appl. No. 12/089,809, filed Apr. 10, 2008, Goering, et al.
U.S. Appl. No. 11/822,862, filed Jul. 10, 2007, Hager, et al.
U.S. Appl. No. 12/279,276, filed Aug. 13, 2008, Roos, et al.
U.S. Appl. No. 60/943,997, filed Jun. 14, 2007, Katusic, et al.

* cited by examiner

THERMOPLASTIC MOLDING MATERIAL AND MOLDING ELEMENTS CONTAINING NANOMETRIC INORGANIC PARTICLES FOR MAKING SAID MOLDING MATERIAL AND SAID MOLDING ELEMENTS, AND USES THEREOF

PRIOR ART

EP 1357151 A1 describes bimodal mixtures of polymers which hitherto have been miscible with one another only to an insufficient extent or, if at all, only by a very complex procedure and with the disadvantages associated therewith, such as, for example, polyethylenes of different molecular weights. Thorough mixing of the different polymer fractions is achieved in particular by bringing the mixtures into contact with a fluid in the supercritical state, e.g. $Co_2$, at high pressures and temperatures and then relaxing the mixtures. It is mentioned that the process is also suitable for incorporating additives or fillers, such as, for example, carbon black, into polymers.

U.S. Pat. No. 6,753,360 B2 describes a process for the preparation of reinforced polymers having improved mechanical properties. Sheet silicates are mixed with a polymer, e.g. propylene, and brought into contact with a fluid in the supercritical state e.g. $CO_2$, at high pressures and temperatures. Isolation of the layers of the sheet silicates to give lamellar silicate particles occurs in the mixture. By subsequent, rapid relaxation of the mixture with an abrupt pressure drop, very uniform dispersing of the isolated silicate particles in the polymer is achieved, resulting in a correspondingly strengthened polymer.

In addition to the development of very small instruments, "Micro-Lab" and circuits or motors, in particular nanochemistry has come to the fore with its achievements. Examples are dirt- and water-repellent coatings, scratch-resistant finishes, novel fillers for car tyres or paint coats which are protected from spray attacks.

OBJECT AND ACHIEVEMENT

The incorporation of nanoscale, inorganic particles into polymeric plastic is expected to give rise to a number of advantages, which may be mentioned here in the form of key words.

Increase in the surface hardness and scratch- or abrasion resistance

Increase in the rigidity in combination with great toughness

Increase in the refractive index

Temperature-independence of the refractive index

Reduction of the (thermal) expansion

Production of barrier properties

Antireflection coating of surfaces

Improvement of the fire behaviour

It is expected in particular that the novel or improved properties will be obtained while retaining the known good properties of plastics, such as, for example, transmission, glass transparency, colourlessness and rheological and mechanical properties.

On incorporation of nanoscale, inorganic particles by means of the processes known to the person skilled in the art, such as compounding on single-screw or twin-screw extruders and melt kneaders, there is in principle the problem that the primary particles may combine to form aggregates in the course of mixing with high-viscosity melts with reduction of the surface energy. These aggregates frequently scarcely still have the positive properties which are hoped for from the primary particles, or do not have said properties at all. On incorporation of nanoscale inorganic particles into thermoplastics by means of the known processes of the prior art, aggregate formation occurs to an extent which has to date substantially prevented achievement of the aims set.

U.S. Pat. No. 6,753,360 B2 describes a process for the preparation of reinforced polymers having improved mechanical properties. The object was considered to be to provide a process which is improved compared with U.S. Pat. No. 6,753,360 B2 and by means of which plastics and a moulding material which contain nanoscale, inorganic particles in as homogeneous dispersion as possible with a high proportion of primary particles are obtained.

U.S. Pat. No. 6,753,360 B2 describes the incorporation of sheet silicates in the form of their lamellar primary particles. Owing to the anisotropic orientation in the plastic, which is associated with their geometry and can scarcely be controlled, lamellar nanoparticles result in a high degree of anisotropy in the resulting properties of the modified plastics. It is therefore intended to provide a process which is particularly suitable also for nonlamellar nanoparticles.

A further problem consists in possible development of fine dust due to the nanoscale, inorganic particles used during their processing. Developments of fine dust should generally be avoided owing to the possible health risks for humans. In the case of lamellar particles, such as, for example, sheet silicates, a certain development of dust may occur during the dry incorporation into a mixture, as in U.S. Pat. No. 6,753,360 B2. This problem occurs to a greater extent, however, if nanoscale, inorganic particles having a maximum aspect ratio of the primary particles of not more than 5 are to be used, since the potential for development of fine dust during handling is once again considerably higher than in the case of sheet-like particles such as the abovementioned sheet silicates, which achieve their properties as nanoparticles only through the step of exfoliation. Many of the nanoscale particles available today and of technical interest have such a geometry of the primary particles which promotes fine dust. In addition, owing to the continuously improved preparation processes, nanoparticle preparations having increasingly high primary particle contents are available, so that the potential for the liberation of fine dust increases simultaneously with the improvement of the preparation processes. It is therefore also intended to provide a procedure in which development of fine dust can be kept low or completely avoided.

The object is achieved by a process for the preparation of a moulding material or a moulding comprising a thermoplastic, containing nanoscale, inorganic particles, the thermoplastic being mixed in the molten state with the nanoscale inorganic particles and a solubilizer in an extruder with screw transport, pressures and temperatures at which the plastic is present as a melt and the solublizer is present in the supercritical state being set, characterized in that the mixture is transported at the exit of the extruder through a passage of less than 20 µm into a flash zone and the melt is discharged with the incorporated, nanoscale, inorganic particles, comminuted after cooling to give a moulding material or transferred into a shaping processing tool and shaped to give a moulding.

With the use of a further extruder, in particular a devolatilization extruder, volatile constituents, such as the solubilizer, can be removed from the mixture. The plastic with the nanoscale, inorganic particles incorporated substantially homogeneously therein can be discharged from the second extruder in this manner and, after cooling, cut to give granules or comminuted to give powder. Alternatively, the melt can be processed directly to a moulding.

The invention furthermore relates to a moulding material or a moulding comprising a thermoplastic obtainable by the process according to the invention, characterized in that nanoscale, inorganic particles having a proportion of primary particles of more than 50%, based on the number of primary particles or optionally on the number of primary particle superstructures which are composed of not more than 30 primary particles, and of aggregates, are present therein. The moulding material according to the invention can be used for the production of mouldings by means of thermoplastic processing, in particular extrusion, injection moulding or injection stamping.

CARRYING OUT THE INVENTION

Process

The invention relates to a process for the preparation of a moulding material or a moulding comprising a thermoplastic, containing nanoscale, inorganic particles.

Thermoplastics

The thermoplastic may be, for example, polyamide, polymethyl methacrylate plastic, impact-modified polymethyl methacrylate, polycarbonate plastic and polyester carbonates, polystyrene plastic, styrene-acrylate-nitrile plastic, polyethylene terephthalate plastic, glycol-modified polyethylene terephthalate plastic, polyvinyl chloride plastic, transparent polyolefin plastics, polyethylene, polypropylene, acrylonitrile-butadiene-styrene (ABS) plastic, cycloolefin copolymers (COC) and/or a blend of different thermoplastics.

Nanoscale Particles

Nanoscale, inorganic particles are commercially available or can be obtained by known processes such as, for example, precipitation processes, sol-gel processes or flame processes (lamp black). The nanoscale, inorganic particles may consist, for example, of indium tin oxide (ITO), silica ($SiO_2$), zirconium $ZrO_2$, corundum $Al_2O_3$, aluminium hydroxide ($Al_2(OH)_3$), zinc oxide (ZnO), titanium dioxide ($TiO_2$), $BaSO_4$ or carbon black and may have a mean primary particle size (approximately the diameter in the case of particles having an approximately round appearance) in the range from 4 nm to 999 nm, preferably from 4 nm to 720 nm, in particular from 2 to 100 nm. Particles having a mean primary particle size (diameter) in the range of the wavelength of visible light from about 380 to 720 nm or less are advantageous, in particular less than 380 nm.

The mean primary particle size can be determined by the person skilled in the art, for example with aid of a microscope, for example of a phase contrast microscope, in particular of an electron microscope (TEM) or by microtomography, for example by measuring a representative number of particles (e.g. 50 or >50 particles), by an image evaluation method.

For example, in carbon black preparations, the primary particles are generally present not individually but as more or less regular structured primary particle superstructures which may be composed of not more than 100, in particular of not more than 50, preferably not more than 15, primary particles.

Maximum Aspect Ratio

The nanoscale, inorganic particles used according to the invention are generally of approximately spherical form. The specification of an aspect ratio can be used in a known manner as a measure of the geometry approximation to the spherical shape.

The invention is particularly suitable for the processing of nanoscale, inorganic particles having a maximum aspect ratio of the primary particles of not more than 5, preferably not more than 3, preferably not more than 2, particularly preferably not more than 1.5. The maximum aspect ratio of the primary particles is understood as meaning the maximum imagable relative ratio of two of the three dimensions length, width and height. In each case the ratio of the largest dimension to the smallest of the other two dimensions is calculated. A primary particle having a length of 15 nm a width of 5 nm and a height of 10 nm has, for example, a maximum aspect ratio (of length to width) of 3. Primary particles having a maximum aspect ratio of 5 may be, for example, short acicular or discus-shaped, tablet-like particles. If the maximum aspect ratio of the primary particles is, for example, not more than 1.5 or less, the primary particles have a more or less spherical or granular form. In contrast, the primary particles of sheet silicates, as used, for example, in U.S. Pat. No. 6,753,360 B2, have maximum aspect ratios of well over 5, in the region of 20 or more.

The abovementioned, nanoscale, inorganic particles having a maximum aspect ratio of the primary particles of not more than 5 in the form of a stabilized dispersion are preferably introduced into the mixture in which at least 70%, in particular at least 80%, preferably at least 90% or at least 95% of the particles are present as primary particles or as primary particle superstructures which are composed from not more than 30, in particular of not more than 20, preferably not more than 15, primary particles.

In carbon black preparations, the primary particles are generally present not individually but as primary particle superstructures which are, for example, composed of not more than 100, in particular of not more than 50, preferably not more than 15, primary particles. The primary particle superstructures are frequently characteristic of the preparation process and the performance characteristics of the respective preparations.

The term particles includes primary particles, primary particle superstructures and aggregates thereof. The undesired aggregates of primary particles or the aggregates of primary particle superstructures should be distinguished from primary particles and primary particle superstructures. Aggregates of primary particles may be composed of two or more primary particles. The aggregates of primary particle superstructures consist of more primary particles than the primary particle superstructures, frequently also of a multiple of the primary particle superstructures. The undesired aggregates may form in the absence of stabilization of the primary particles and primary particle superstructures during the storage of the particles of the dispersion or during the processing under unsuitable process conditions.

Dispersions

The nanoscale, inorganic particles are preferably introduced in the form of a dispersion into the mixture. This has the advantage that development of fine dust is avoided during the incorporation. Dispersions can optionally also be designated as suspensions of colloidal solutions.

As a rule, the dispersions contain one or more stabilizers which prevent the primary particles or optionally primary particle superstructures present from forming larger aggregates in an undesired manner during the storage. Known stabilizers, which are also designated as pigment dispersants, are, for example, emulsifiers; for example, surface-active polymers or phosphonic acid derivatives, e.g. phosphonic acid derivatives in which a part of the molecule is nonpolar, are known.

The dispersion preferably has a solids content of from 10 to 40, in particular from 12 to 25%, by weight of nanoscale, inorganic particles.

The dispersion of the nanoscale, inorganic particles may be present in a liquid which is not a solubilizer in the context of the invention, e.g. in water. Accordingly, it may be, for example, an aqueous dispersion. This has the advantage that the dispersion can be metered independently of solubilizers.

The dispersion of the nanoscale, inorganic particles is preferably present in a solubilizer which is liquid at room temperature, e.g. ethanol or methanol, which can go over into a supercritical state at temperatures at which the plastic is present as a melt, on application of appropriately high pressures. Here, for example, the total amount of solubilizer required for the process can be added in the form of the dispersion. However, it is also possible to add only a relatively small amount of the amount of solubilizer required for the entire process in the form of the dispersion. The remaining amount is then metered separately, and it may comprise the same or another solubilizer, optionally also a solubilizer which is gaseous at room temperature, e.g. $CO_2$.

The abovementioned nanoscale, inorganic particles having a maximum aspect ratio of the primary particles of not more than 5 are preferably introduced in the form of a stabilized dispersion into the mixture. In the dispersion, at least 70%, in particular at least 80, preferably at least 90 or at least 95% of the particles are present as primary particles or as primary particle superstructures, the latter as a rule being composed of not more than 100, in particular of not more than 50, preferably not more than 15, primary particles.

Solubilizers

Solubilizers in the context of the invention are substances which can change to a supercritical state at temperatures at which the plastic is present as a melt, e.g. at 200 to 350° C. or at 200 to 300° C., with the application of high pressures, e.g. 70 to 250 bar. Preferred solubilizers are those which are inert to the thermoplastic or do not undergo chemical reactions with it at pressures and temperatures at which the plastic is present as a melt and the solubilizer is present in a supercritical state.

Suitable solubilizers are, for example, carbon dioxide, nitrous oxide ($N_2O$), xenon, krypton, methanol, ethanol, isopropanol or isobutanol or a mixture of said solubilizers. Carbon dioxide, methanol, ethanol, isopropanol or isobutanol are preferred.

Processing Conditions

The thermoplastic can be mixed together with the nanoscale, inorganic particles and a solubilizer, at pressures and temperatures at which the plastic is present as a melt and the solubilizer is present in a supercritical state, in an extruder having screw transport, a single-screw or a multiscrew extruder. For this purpose, the plastic can be fed in a known manner via the feed zone of the extruder in the form of a solid, generally as granules or powder, and is melted, transported by the screw or, in the case of multiscrew extruders, by the screws, and the required pressure and required temperature for achieving the supercritical state of the mixture are set. After the plastic is present in the molten state and has a temperature of from 200° C. to 350° C. or 200° C. to 300° C., preferably from 220° C. to 280° C., and a pressure of from 70 bar to 250 bar, preferably from 170 bar to 230 bar, the respective solubilizer can be fed into the extruder via a metering point by means of a pump. The desired amount of nanoscale, inorganic particles can be fed as an aqueous dispersion or as a dispersion in an organic solvent via a further metering point which is mounted downstream of the solubilizer metering point. A preferred procedure may also comprise feeding in the dispersion in a suitable solubilizer present in the supercritical state at the established process parameters of pressure and temperature.

Pressure and temperature must in each case be above the critical temperature and the critical pressure of the solubilizer chosen.

Pressures and temperatures can in this case preferably be selected such that damage to the thermoplastic by thermal decomposition or other forms of property losses only occurs to a very small degree, if at all.

For example, methanol has a critical temperature of 240.5° C. and a critical pressure of about 78.9 bar. The incorporation of nanoscale, inorganic particles into the plastic polymethyl methacrylate, which can be processed in the molten state at 250° C., could therefore be effected, for example, at 250° C. and 200 bar using methanol as a solubilizer.

For example, ethanol has a critical temperature of about 243° C. and a critical pressure of about 63 bar. The incorporation of nanoscale, inorganic particles into the plastic polymethyl methacrylate, which can be processed in the molten state at 250°0 C. could therefore be effected, for example, at 250° C. and 200 bar using ethanol as a solubilizer.

If appropriate, the solubilizer ethanol can also serve as a dispersion liquid phase for the nanoscale, inorganic particles and can be used together with methanol as a solubilizer for the plastic melt.

The process is particularly preferably carried out by first melting the thermoplastic, e.g. polymethyl methacrylate at a temperature from 200° C. to 350° C. or 200° C. to 300° C., preferably from 220° C. to 280° C., in particular from 250° C. to 270° C., and a pressure of from 70 bar to 250 bar, preferably from 170 bar to 230 bar, in particular from 180 bar to 220 bar, in an extruder, metering in a suitable solubilizer in a concentration of from 10 to 30% by weight, preferably from 15 to 25% by weight, based on the thermoplastic, metering in a 5 to 50, preferably 10 to 30% strength dispersion (weight/weight) of nanoscale particles in the same or another solubilizer, which is likewise present in the extruder in a supercritical state at said temperatures and pressures so that a content of nanoscale particles in the plastic or based on the plastic of from 0.01% by weight to 20% by weight, preferably from 0.1% by weight to 10% by weight and in particular from 1% by weight to 5% by weight, results.

Process Variants

The process steps can be carried out, for example, in the following sequence:
  i) conversion of thermoplastic polymer into the molten state
  ii) addition of the nanoscale, inorganic particles in the form of a dispersion in the solubilizer to the polymer melt and mixing of the components
  iii) conversion of the mixture into the supercritical state The process steps can alternatively be carried out in the following sequence:
  i) conversion of thermoplastic polymer into the molten state
  ii) simultaneous or subsequent mixing in of the solubilizer
  iii) conversion of the mixture into the supercritical state
  iv) addition of the nanoscale, inorganic particles in the form of a dispersion to the supercritical mixture.

The process steps can furthermore be carried out in the following sequence:
  i) conversion of thermoplastic polymer into the molten state
  ii) simultaneous or subsequent mixing in of the solubilizer iii) addition of the nanoscale, inorganic particles in the form of a dispersion iv) conversion of the mixture into the supercritical state The thermoplastic can be mixed together with the nanoscale, inorganic particles and the solubilizer, at a temperature of 200° C. to 300° C. and a pressure of 70 bar to 250 bar in an extruder.

The thermoplastic can, for example, be melted at a temperature of 200° C. to 300° C. and a pressure of 70 bar to 250 bar in the extruder, and the solubilizer metered in a concentration of 10% to 30% by weight, based on the thermoplastic. A 5 to 50% strength (% by weight), preferably 10 to 30% strength by weight dispersion of nanoscale, inorganic particles in the same or another solubilizer, which is likewise present at said temperatures and pressures in the extruder in a supercritical state, can be metered in, so that, after removal of the liquid and gaseous constituents, a content of nanoscale, inorganic particles of 0.01% by weight to 20, in particular 0.1 to 18, preferably 1 to 10%, by weight is established in the plastic.

As a further process variant, it is also possible to prepare moulding material granules which contain nanoscale, inorganic particles. Even if the moulding material contains a high proportion of undesired aggregates, these are dispersed again to form primary particles or optionally primary particle superstructures with the use of the process according to the invention in one of its possible variants (cf. Examples 2 and 3).

Passage/Pressure Control Valve

The choice of a passage of less than 20 μm represents a special technical measure which is of particular importance for carrying out the invention (cf. Example 1). The measure serves not only for relaxing the mixture but especially for building up very high shear rates. The choice of the passage of less than 20 μm ensures that the mixture passes through it at a shear rate of 10 000 to 100 000, preferably of 20 000 to 70 000, $s^{-1}$. It was not foreseeable that the mixture would be able to pass through such a narrow passage without technical problems. Example 4 shows that a passage of 25 μm already leads to unsatisfactory results.

The mixture of thermoplastic, nanoscale, inorganic particles and solubilizer in the supercritical state is transported at the exit of the extruder through a passage of less than 20 μm, e.g. from 1 μm to 20 μm or from 1 μm to less than 20 μm, preferably from 2 μm to 10 μm, into a flash vessel, for example a container, a flash chamber or a further extruder. The mixture in this state is still liquid and has a fluid, supercritical state which can be designated neither as gaseous nor as liquid, so that it can pass through the passage without technical problems at a very high shear rate.

A pressure control valve having an annular gap is preferably used for providing the passage. The piston diameter may be, for example, from 1 mm to 10 mm, preferably from 2 mm to 5 mm. The gap width is preferably in the range from 1 μm to 20 μm or from 1 to less than 20 μm, preferably from 2 μm to 10 μm, with a gap length of from 5 mm to 30 mm, preferably from 5 mm to 15 mm.

The pressure control valve exit is preferably connected directly to a further extruder, preferably to a vented extruder, and permits let down of the pressure of the mixture under very high shear rates which contribute to the substantially homogeneous distribution and the production of a high proportion of primary particles. In the further extruder or vented extruder, volatile constituents can be removed. The melt with the incorporated, nanoscale, inorganic particles is discharged and can be comminuted after cooling to give a moulding material, granules or powder, or transferred directly into a shaping processing tool, e.g. a broad slot extrusion die or an injection moulding apparatus or an injection mould and shaped there directly to give a moulding.

Moulding Material/Moulding

The moulding material or the moulding according to the invention and comprising a thermoplastic is obtainable by the process described.

The moulding material or the moulding contains the nanoscale, inorganic particles, for example, in amounts of from 0.01% by weight to 20% by weight, preferably from 0.1% by weight to 10% by weight, in particular from 1% by weight to 5% by weight.

The moulding material or the moulding contains nanoscale, inorganic particles having a proportion of primary particles or primary particle superstructures, the smallest particles or subunits, of more than 50%, preferably of at least 75%, in particular at least 90%, based on the number or sum or totality of the particles.

If nanoscale particles are predominantly present in the form of primary particles, aggregates are particles which consist of two or more primary particles. For example with a proportion of 90% of primary particles, 10% of the particles are therefore aggregates.

If nanoscale particles are predominantly present in the form of primary particle superstructures which are composed, for example, of not more than 100 primary particles or of a smaller number of primary particles (e.g. in the case of carbon black preparations), aggregates are particles which are composed of more primary particles than the primary particle superstructures and in turn generally consist of a plurality or multiplicity of aggregated primary particle superstructures.

For example, with a proportion of 90% of primary particle superstructures, 10% of the particles are therefore aggregates.

The proportion of primary particles in the totality of the primary particles and of the aggregates or the primary particle superstructures and the aggregates thereof can be determined by the person skilled in the art, for example, with the aid of an optical microscope, of an electron microscope (TEM) or by microtomography, for example by evaluating a representative number of particles (e.g. 50 or >50 particles), by an image evaluation method.

The thermoplastic or the moulding material or the moulding preferably comprises nanoscale, inorganic particles primary particles having a maximum aspect ratio of at most 5, in particular at most 3, preferably at most 2, particularly preferably at most 1.5.

Use

The moulding material according to the invention can be used for the production of mouldings by means of thermoplastic processing known per se, in particular extrusion, injection moulding or other known methods of plastics processing.

EXAMPLES

Example 1 (According to the Invention—10 μm Passage)

Experiments for dispersing nanoscale, inorganic particles were carried out on a laboratory extrusion unit consisting of a single-screw extruder having a screw diameter of 45 mm and a screw length of 36 D and a flange-connected further single-screw extruder having a screw diameter of 45 mm and a screw length of 24 D. 10 kg/h of a polymethyl methacrylate moulding material (polymer comprising 96% by weight of methyl methacrylate and 4% by weight of methacrylate) as granules are fed to the feed zone of the first extruder by means of a gravimetric metering device. After homogeneous thermoplastic melt is present, LEWA methanol is pumped into the extruder in a mixing zone consisting of a cavity transfer mixer (CTM) by means of a metering pump at a pressure of 200 bar and in an amount of 2.0 kg/h. In a further mixing zone which is likewise equipped with a CTM, an aqueous dispersion of 25% (% by weight) of nanoscale $SiO_2$ having a primary particle size of 5 nm and a maximum aspect ratio of the primary particles of less than 2 is pumped into the extruder in an amount of 1.2 kg/h by means of a diaphragm metering pump.

A pressure control valve which has a 3 mm cylindrical valve insert is mounted at the end of the extruder. At a valve position of 80% of the valve stroke, a passage of less than 20 µm, namely of 10 µm, is established, which leads to a pressure level of 200 bar in the extruder. The measured melting point is 250° C.

A direct connection to the downstream extruder is produced via the pressure control valve. After passage through the shear gap of the pressure control valve, which takes place at an extremely high shear rate, the mixture of polymer, solvent, water and nanoscale inorganic particles incorporated therein is expanded and the volatile fractions are vaporized and are taken off via two devolatilization orifices of the extruder. The devolatilization zones are operated at different pressure levels and are separated by vacuum technology.

The polymer melt comprising nanoscale inorganic particles and freed from the volatile fractions is shaped into extrudates by means of a die, taken off via a water bath and cut by means of a granulator. The granules thus obtained are injection moulded on a Battenfeld BA 350 CD injection moulding machine to give small panels having the dimension 65×40×3 mm. The distribution of the nanoscale inorganic $SiO_2$ particles on the small panels was investigated by means of a microscope.

No aggregates are detectable in the small injection moulded panels. On visual inspection, the small panels show very good optical properties of the starting material with slight turbidity. The proportion of primary particles, based on primary particles and aggregates, can be determined by evaluating electron micrographs and is about 85%.

Example 2 (Comparative Example—Without Passage)

On a Leistritz LMS 30.34 twin screw kneader, 10 kg/h of a polymethyl methacrylate moulding material (polymer comprising 96% by weight of methyl methacrylate and 4% by weight of methacrylate) are fed in the feed zone of the extruder by means of a gravimetric metering device from Engelhardt, drawn in and plasticized. 1.2 kg/h of the aqueous $SiO_2$ nanodispersion from example 1 are pumped into the extruder by means of a metering device consisting of an injection valve, a pipeline and a diaphragm pump. The mixing zone of the extruder into which the nanodispersion is pumped is equipped with mixing elements and kneading blocks for achieving the best possible mixing effect, as known to the person skilled in the art and recommended by extruder suppliers.

In a downstream devolatilization zone, the volatile fractions are removed and extrudates are drawn by means of a die, cooled, and cut using a granulator.

The granules obtained were injection moulded as described in example 1 to give small panels of 65×40×3 mm and the latter were assessed visually. Relatively large, aggregated, nanoscale $SiO_2$ particles are clearly recognizable. The proportion of primary particles can be determined by evaluating electron micrographs and is below 20%.

Example 3 (According to the Invention—Processing of the Granules from Example 2)

The product obtained from example 2 was fed at 10 kg/h to the feed zone of the extruder on the nanodispersing unit according to example 1 by means of the gravimetric metering device installed there. Corresponding to example 1, 2.0 kg/h of methanol are metered into the first mixing zone. The set parameters of pressure and temperature were identical to the set values used in example 1. The granules obtained were injection moulded to give small panels. The injection mouldings produced exhibit virtually agglomerate-free, dispersed nanoparticles. The proportion of primary particles can be determined by evaluating electron micrographs and is about 85%.

Example 4 (Comparative Example—25 µm Passage)

Example 4 corresponds to Example 1, with the difference that a passage of 25 µm is established at a valve position of 40% of the valve stroke. 65×40×3 mm lamellae are produced as in Example 1 by injection moulding from the granules obtained and are visually assessed. Larger, aggregated, nanoscale $SiO_2$ particles are clearly visible. The proportion of the primary particles can be determined by evaluating electron micrographs and is below 35%.

Example 5 (Cassius Gold Purple)

The aqueous dispersion of nanoscale $SiO_2$ from Example 1 can be replaced by a colloidal gold solution, the so-called Cassius gold purple, for test purposes. The colloidal gold solution contains $H_2O$ and the elements Au, Sn Cl and optionally Sl; the starting compound is tetrachlorohydrogenaurate ($HAuCl_4$) and has a dark red, purple-like colour. The "Cassius gold purple" is known to the person skilled in the art. The nanoscale gold particles present are predominantly in the form of primary particles having a mean primary particle size in the range of 20-30 nm. The increased formation of aggregates in the colloidal "gold" solution is indicated by a colour change to blue or brown.

In the procedure according to the invention, for example according to Example 1, the "gold" particles are incorporated into a polymethyl methacrylate matrix, for example in a concentration in the region of 10 ppm. Lamellae are produced as in Example 1 by injection moulding from the granules obtained and are visually assessed. A dark red to purple-like shimmering polymethyl methacrylate injection moulding is obtained. The wavelength spectrum shows that the position of the absorption maximum in the range of 500-580 nm of the polymethyl methacrylate injection moulding and of the colloidal starting solution virtually correspond. This may be considered evidence that agglomeration of the primary particles originating from the colloidal "gold" solution is substantially prevented by means of the process according to the invention.

The invention claimed is:
1. A process for the preparation of a moulding material or a moulding, comprising:
melting a thermoplastic polymer;
adding nanoscale inorganic particles and a solubilizer having a supercritical state to the molten thermoplastic polymer;

mixing the molten thermoplastic polymer with the added nanoscale inorganic particles and solubilizer having a supercritical state to obtain a molten mixture of the thermoplastic polymer, nanoscale inorganic particles and solubilizer having a supercritical state;

mixing the obtained molten mixture with in an extruder with a screw transport, wherein a temperature and pressure of the mixing are such that the solubilizer is in the supercritical state and the mixture is molten;

transporting the molten mixture to an exit of the extruder having a passage of less than 20 μm;

subjecting the molten thermoplastic polymer nanoscale inorganic particle, supercritical solubilizer mixture to a high shear of from 10,000 to 100,000 $s^{-1}$ by passing through the passage of less than 20 μm into a flash zone; and discharging the melt with the incorporated nanoscale inorganic particles, comminuted after cooling from the flash zone to give a moulding material or transferring the melt with incorporated nanoscale particles from the flash zone into a shaping processing tool and shaping the transferred melt to give a moulding.

2. The process according to claim 1, wherein the nanoscale inorganic particles is selected from the group consisting of indium tin oxide (ITO), silica ($SiO_2$), aluminium hydroxide ($Al_2(OH)_3$), zinc oxide (ZnO), titanium dioxide ($TiO_2$), $BaSO_4$, and carbon black, wherein a mean primary particle size is in the range from 4 to 999 nm.

3. The process according to claim 1, wherein the solubilizer having a supercritical state is at least one selected from the group consisting of $CO_2$, $N_2O$, xenon, krypton, methanol, ethanol, isopropanol and isobutanol.

4. The process according to claim 1, wherein the nanoscale inorganic particles are added as a dispersion into the mixture.

5. The process according to claim 4, wherein a content of the nanoscale inorganic particles in the dispersion is from 5 to 50% by weight.

6. The process according to claim 1, wherein a maximum aspect ratio of primary particles of the nanoscale inorganic particles is not more than 5 and the nanoscale inorganic particles are introduced into the mixture as a stabilized dispersion in which at least 70% of the particles are present as the primary particles or primary particle superstructures which are composed of not more than 30 primary particles.

7. The process according to claim 4, wherein the dispersion of the nanoscale inorganic particles is present in a liquid which is not said solubilizer.

8. The process according to claim 7, wherein the dispersion liquid is water.

9. The process according to claim 1, wherein the dispersion of the nanoscale inorganic particles is present in said solubilizer.

10. The process according to claim 1, wherein the flash zone for expanding the mixture is a second screw extruder.

11. The process according to claim 10, wherein volatile constituents are removed in the second screw extruder.

12. The process according to claim 1, wherein the thermoplastic polymer is selected from the group consisting of polyamide, polymethyl methacrylate plastic, impact-modified polymethyl methacrylate, polycarbonate plastic and polyester carbonates, polystyrene plastic, styrene-acrylatenitrile plastic, polyethylene terephthalate plastic, glycol-modified polyethylene terephthalate plastic, polyvinyl chloride plastic, transparent polyolefin plastic, polyethylene, polypropylene, acrylonitrile-butadiene-styrene (ABS) plastic, cycloolefin copolymers (COC), and mixture thereof.

13. The process according to claim 1, wherein the mixing comprises i), ii), and iii), in the following sequence:
   i) converting thermoplastic polymer into the molten state;
   ii) adding the nanoscale inorganic particles in the form of a dispersion in the solubilizer to the polymer melt and mixing of the components; and
   iii) converting of the mixture into the supercritical state.

14. The process according to claim 1, wherein the mixing comprises i), ii), iii), and iv), in the following sequence:
   i) converting thermoplastic polymer into the molten state;
   ii) simultaneous or subsequent mixing in of the solubilizer;
   iii) converting the mixture into the supercritical state; and
   iv) adding the nanoscale inorganic particles dispersion to the supercritical mixture.

15. The process according to claim 1, wherein the mixing comprises i), ii), iii), and iv), in the following sequence:
   i) converting thermoplastic polymer into the molten state;
   ii) simultaneous or subsequent mixing in of the solubilizer;
   iii) adding the nanoscale inorganic particles dispersion; and
   iv) converting the mixture into the supercritical state.

16. The process according to claim 1, wherein the thermoplastic polymer is mixed together with the nanoscale inorganic particles and the solubilizer at a temperature of from 200° C. to 350° C. and a pressure of from 70 bar to 250 bar in the extruder.

17. The process according to claim 1, wherein the solubilizer is metered in at a concentration of 10 to 30% by weight, based on the weight of the thermoplastic polymer.

18. The process according to claim 1, wherein an obtained content of the nanoscale inorganic particles in the thermoplastic polymer is from 0.01% to 20% by weight.

19. The process according to claim 1, wherein
   the thermoplastic is melted at a temperature of from 200° C. to 350° C. and a pressure of from 70 bar to 250 bar in the extruder,
   the solubilizer is metered in at a concentration of from 10% to 30% by weight, based on the weight of the thermoplastic polymer, and
   a dispersion comprising 5 to 50% by weight of the nanoscale inorganic particle in the same or another solubilizer, which is likewise present in the extruder in a supercritical state at said temperatures and pressures, is metered in to obtain a content of the nanoscale inorganic particles in the thermoplastic polymer of from 0.01% to 20% by weight.

20. The process according to claim 1, wherein the exit of the extruder comprises a pressure control valve having an annular gap of from 1 mm to 10 mm piston diameter, a gap width of from 1 μm to 20 μm and a gap length of from 5 mm to 30 mm.

21. A method for producing mouldings, comprising the process for the preparation of a molding material according to claim 1, wherein the method is for processing of a thermoplastic polymer by extrusion, injection moulding, or injection stamping.

* * * * *